United States Patent
Caroli

[11] Patent Number: 5,844,712
[45] Date of Patent: Dec. 1, 1998

[54] REFLEX PIN WITH ADJUSTED ANGLE

[75] Inventor: Italo Caroli, Westmount, Canada

[73] Assignee: DBM Reflex Enterprises, Inc., Lavalle, Canada

[21] Appl. No.: 795,340

[22] Filed: Feb. 4, 1997

[30] Foreign Application Priority Data

Feb. 19, 1996 [CA] Canada ................................. 2169807

[51] Int. Cl.⁶ ................................................. G02B 5/122
[52] U.S. Cl. ......................... 359/529; 359/530; 249/117
[58] Field of Search .................................... 359/529, 530; 425/808; 249/117

[56] References Cited

U.S. PATENT DOCUMENTS

| | | |
|---|---|---|
| 3,817,596 | 6/1974 | Tanaka . |
| 3,873,184 | 3/1975 | Heenan . |
| 3,899,154 | 8/1975 | Tanaka ................................... 249/117 |
| 3,923,378 | 12/1975 | Heenan . |
| 3,926,402 | 12/1975 | Heenan ................................... 249/117 |
| 4,066,331 | 1/1978 | Lindner . |
| 4,080,280 | 3/1978 | Heasley ................................... 204/281 |
| 4,588,258 | 5/1986 | Hoopman . |
| 4,775,219 | 10/1988 | Appeldorn et al. . |
| 4,938,563 | 7/1990 | Nelson et al. . |
| 5,138,488 | 8/1992 | Szczech ................................... 359/529 |

FOREIGN PATENT DOCUMENTS

| | | | |
|---|---|---|---|
| 1321726 | 8/1993 | Canada ........................... | G02B 5/122 |
| 2040909 | 8/1995 | Canada ........................... | G02B 5/124 |

*Primary Examiner*—James Phan
*Attorney, Agent, or Firm*—Walter W. Duft

[57] ABSTRACT

Reflex pins for use in the manufacture of reflector assemblies or surfaces have three faces, the relative position of each face with respect to adjacent faces is 120°. According to the disclosure, selected cube faces of pins are cut to an angle that is adjusted from the convention angle of 120° whereby light reflected from a product of such reflex pins is redirected or redistributed from one area of the zone of reflectivity to substantially increase the intensity of light to the location of a viewer or a recording device's light sensitive element at another area of the zone of reflectivity. A method of making such pins is also disclosed.

8 Claims, 6 Drawing Sheets

REFLEX PIN WITH ADJUSTED ANGLE

TECHNICAL FIELD

This invention relates to reflecting surfaces, specifically though not limited to, the type used in the automotive field and to the method of making such surfaces.

BACKGROUND OF THE INVENTION

The faces of reflex pins are cut at an angle so that light reflective surfaces manufactured from those pins reflect light from their surfaces with a certain spread of the light over a given distance. In cubecorner reflectors manufactured from reflex pins, the angle between the longitudinal cube axis (i.e. the longitudinal axis of the pin) and each face of each cube-corner reflector element (i.e. each of the three pin faces) is approximately 35°17'. The three reflecting adjacent surfaces of a cube-corner rotate the direction of an incoming light beam so that the reflecting light exits to the direction of the incoming light beam with a spread sufficient to meet required standards. Moreover, this is the result of the three faces of a reflex pin being cut so that the relative position of each face with respect to adjacent faces is 120°.

The effective area of each single cube-corner is represented by a hexagonal shape. Incident light directed into the cube-corner is reflected back towards the light source and with the required spread mentioned above which may be referred to as a zone of reflectivity. For example, in accordance with an S.A.E. standard, a light beam directed at the reflecting surface from a source 100 feet away must be reflected back towards that source with an angle of spread of 12'. In accordance with a comparable European standard, the angle of reflection within the zone is 20' over a space of 10 meters between the source of incident light and the reflecting surface.

This zone of reflectivity may be considered in the configuration of a cone with the base of the cone of reflected light being perpendicular to the light source and on a screen perpendicular to the light source at that location, the reflected light from the cube-corner is concentrated at six points of a hexagon. The requirements of the zone of reflectivity ensures that if the source of incident light is, for example, the headlights of an automobile and the reflective surface is on the rear end of another automobile 100 feet away, the reflecting surface will return the light beam to a viewer in the following automobile, the viewer being normally located at the top of the hexagon on the test screen.

Reflector devices that are mounted on the rear of vehicles, such as in taillight assemblies, are manufactured from molds produced by electroforms made from pin bundles in a mold. Individual reflex pins from which the electroforms are made have their end portions configured as a cube-corner element and with the relative position between the three faces of the pin being 120°. Typically, the reflex pins and subsequently the cube-corner reflex elements are arranged in discrete groups. Due to slight imperfections in the manufacture of the molds from the reflex pins and thereafter the actual reflective surfaces, the points on the hexagon referred to above tend to diverse or spread out somewhat beyond their reflecting axes. Moreover, to the eyes of a viewer at the above axis of the incident light beam (typically, seated in an automobile above its headlights) much of the light being reflected from the reflector surface is wasted in that it is directed to the lateral and lower part of the reflected zone (or to the sides and lower points of the hexagon on the screen) when returned to the area of the incident light source. In other words, if the light reflected back to the area of the automobile having the incident light beam in the form of its headlights, much of the reflected light in the zone of reflectivity will fall to the sides and below the sight of the viewer.

The object of the present invention is to redirect or redistribute some or most of the light in the lateral areas of the hexagon i.e. the "wasted" light and raise a portion of that wasted reflective light higher in the cone towards the eyes of the viewer so that the intensity of the reflected light in the upper part of the cone is substantially increased. This in effect will theoretically triple the efficiency of the reflected light in the areas where it is most needed. Translating that into a product of a reflecting surface, the same efficiency can be obtained from a reflecting surface of substantially smaller size or one may theoretically triple the efficiency of a reflecting surface of equal size.

PRIOR ART

Several United States Patents are directed to a method of manufacturing reflecting surfaces to broaden the zones of reflection, one example being found in U.S. Pat. 3,923,378 Heenan. Other examples are found in the following U.S. Patents:

U.S. Pat. No. 4,588,258 May 13, 1986
U.S. Pat. No. 4,775,219 Oct. 4, 1988
U.S. Pat. NO. 4,938,563 Jul. 3, 1990
U.S. Pat. No. 5,138,488 Aug. 11, 1992

Most of these U.S. Patents are concerned with reflector surfaces of micro prismatic material such as that found on highway signs and the like and the direction of these patents is to widen the reflex zone so that these signs are more visible to automobile drivers which are located well off axis with respect to the reflecting surfaces.

Another example of this is found in Canadian Patent 2,040,909 of Aug. 1, 1995.

Other U.S. Pat. Nos. such as 3,926,402 and 4,080,280 disclose pin arrangements for use in making cube-corner reflectors but the pins themselves are positioned at different angles with respect to one another. None of the prior specifications disclose the arrangement of the present invention wherein the relative position of the faces on a reflex pin are changed.

SUMMARY OF THE INVENTION

The present invention has as its object to provide a reflecting surface which will redirect or distribute a portion of light reflected from the reflecting surface thereby to increase the brightness/intensity of the reflected light at specific areas adjacent a light measuring device (photocell) and thereby reduce the spread of reflected light into wasted areas that are not normally viewed from the region of the eye of the viewer and/or the measuring device.

This is accomplished by changing the relative position of faces of the reflex pins used in the manufacture of the molds for making the reflecting surfaces. According to one broad aspect, the invention relates to a method of increasing the intensity of light normally reflected back to a light source from a reflecting surface formed of cube-corner reflecting faces having operative reflex angles of approximately 120°, the method comprising adjusting the reflex angles of selected ones of the reflecting faces in the reflecting surface to beyond 120° to redirect a portion of the light and to thereby increase the density of the reflected light back to specific areas at or adjacent to the light source.

According to a further broad aspect, the invention relates to a reflecting surface for reflecting light back to an area of the light source, the surface being formed from a plurality of cube-corner reflecting faces having operative cube angles of approximately 120° wherein selective reflecting faces have their cube angles adjusted to approximately 120°6' to thereby redirect a portion of light reflected from the reflecting surface back to specific areas at or adjacent to the light measuring device.

According to another broad aspect, the invention relates to reflex pins for use in the manufacture of reflector assemblies or surfaces wherein each of said pins have each of their three cube faces angled at 120° with respect to adjacent faces on the pin. The improvement comprises having selected cube faces of the pins cut to an angle that is adjusted from the conventional angle of 120° whereby light reflected from a product of such reflex pins is redirected or redistributed from one area of the zone of reflectivity to substantially increase the intensity of the reflected light to the location of a viewer or a recording device's light sensitive element, at another area of the zone of reflectivity.

According to another broad aspect, the invention relates to a method of redirecting a portion of light normally reflected into a zone of reflectivity from a reflecting surface formed of cube-corner reflecting faces having operative reflex angles of approximately 120° with respect to one another, the redirection being from one area of said zone of reflectivity to another area therein, whereby the reflected light is thereby intensified, the method comprising adjusting the angle of selected reflecting faces of the cube-corner reflex elements from 120° to 120°6'.

BRIEF DESCRIPTION OF THE DRAWINGS

The invention is illustrated by way of example in the accompanying drawings in which:

FIG. 6 is an elevation view of the pin shown in

DESCRIPTION OF THE PREFERRED EMBODIMENT

Figure 1:
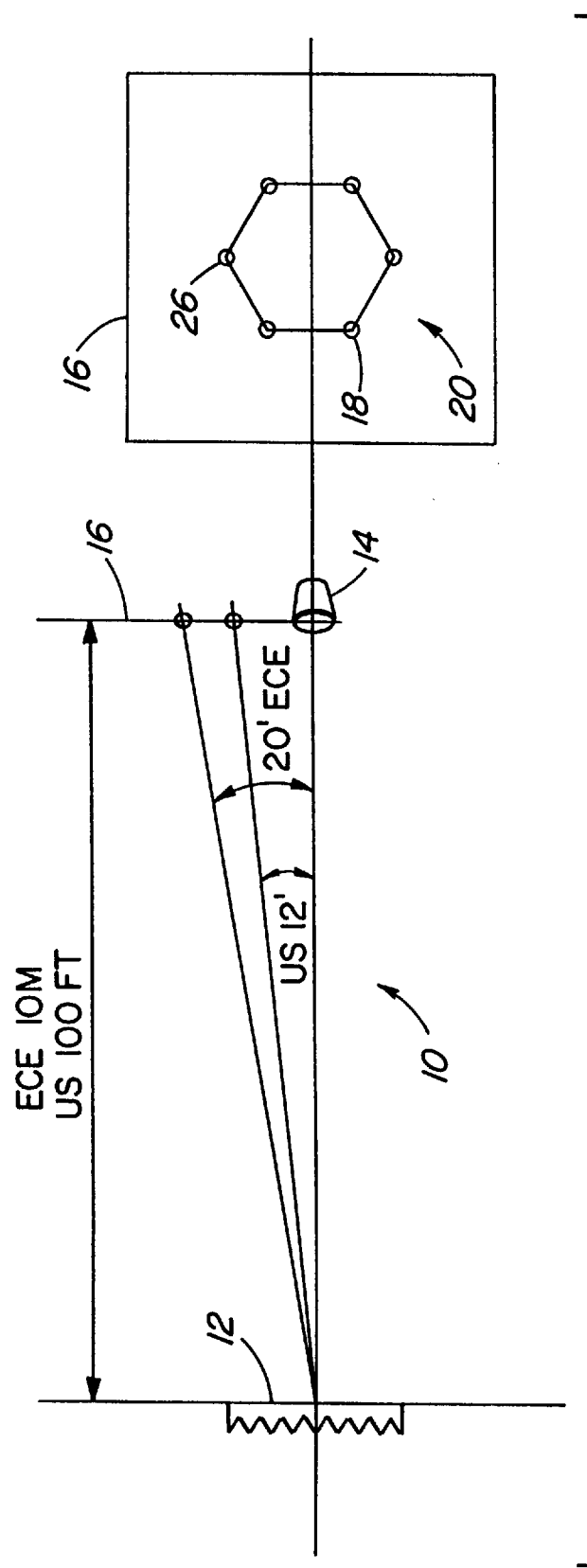
FIG. 1 is a schematic drawing of a zone of reflectivity used in measuring reflected light.

FIG. 1 is a schematic view of a zone of reflectivity used in measuring reflected light. The zone 10 is defined by the reflecting surface 12 at one end and the light source 14 at the other end and these are spaced 100 feet apart in accordance with S.A.E. standards and 10 meters apart in accordance with European standards. As shown in FIG. 1, the spread of reflected light in accordance with the S.A.E. standard is 12' and this extends to 20' in accordance with the European requirements. This light reflected from cube-corner reflectors will be displayed on a screen 16 located perpendicular to the light source 14 and the faces of the reflecting surfaces will return the light to the screen in the form of six points 18 in a hexagonal pattern 20.

Figure 2:
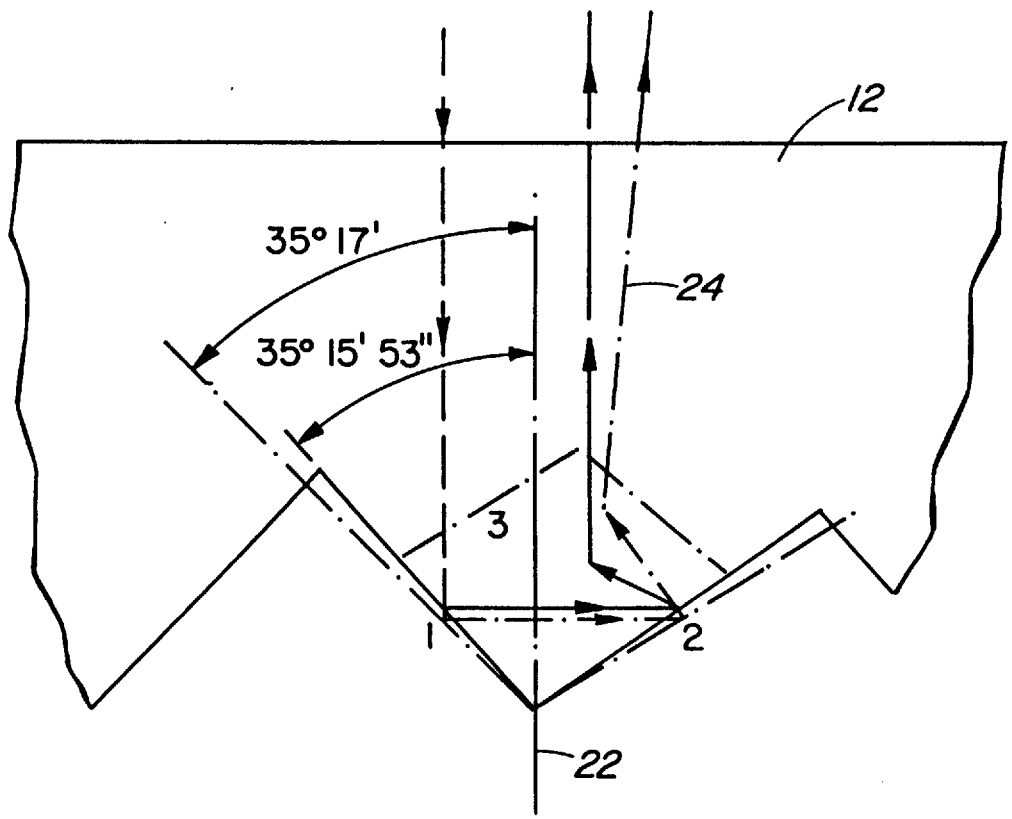
FIG. 2 is a schematic sectional view of a portion of a reflecting surface.
Figure 3:
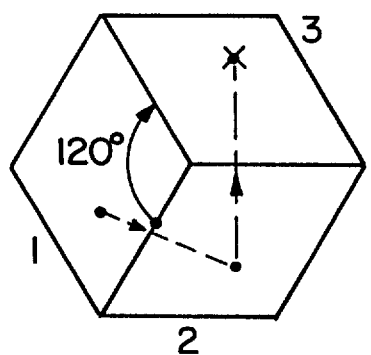
FIG. 3 is a plan view of a cube-corner reflector and the incident and reflected light paths associated therewith.

As shown in FIGS. 2 and 3, the incident light beam from the source 14 is returned from the cube-corner reflector 12 by means of the faces identified as 1, 2 and 3 in FIGS. 2 and 3 of the cube-corner, these faces having an angle of approximately 35°17' with respect to the longitudinal axis 22 of the reflecting surface and of the pins used in the manufacture of that reflecting surface. Moreover, as shown in FIG. 3, faces 1, 2 and 3 of the cube-corner reflector and which had been formed by the end of a reflex pin as shown in FIG. 3, have relative angles of 120° with respect to one another.

Due to the angle of 35°17' as shown in FIG. 2 and the relative face angles of 120° shown in FIG. 3, the light is returned as shown in the phantom line 24 in FIG. 2 into the zone of reflectivity 10 to the six points 18 on the hexagonal pattern 20 on the receiving screen.

The top point of the hexagon illustrated as 26 would be the location of a photocell or similar light measuring device used in the tests of the zone of reflectivity.

Figure 4:
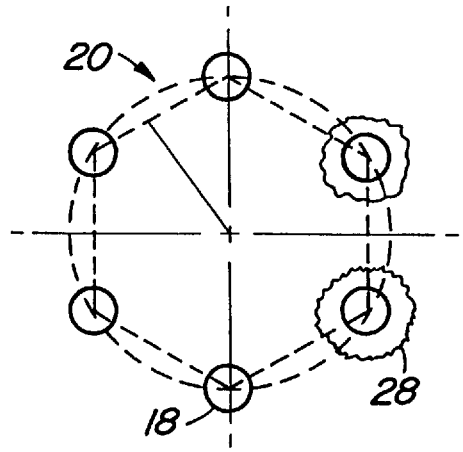
FIG. 4 is a schematic elevation view of a screen for measuring reflected light.

As shown in FIG. 4, the points 18 of the hexagon are not clearly defined because, typically, imperfections in the manufacturing processes result in a somewhat broadening or dissipating of the hexagonal points to a pattern as shown at 28 in FIG. 4.

It will be appreciated from a review of FIG. 4 that if the location of the light source 14 in FIG. 1 is translated into the position of a headlight of an automobile and if the top point 26 of the hexagon on the measuring screen is translated into the eyes of a viewer such as the operator of the motor vehicle then it will be seen that much of the light reflected from the reflex surface 12 back to the zone of reflectivity is wasted inasmuch as it is directed to areas in the cone that are away from the eyes of the viewer i.e. the point 26 on the hexagon.

Accordingly, the present invention provides means for redirecting or redistributing a portion of the reflected light from the wasted areas of the zone into the area of the viewer and substantially increases the intensity of the reflected light to that redirected point on the hexagon.

Figure 5:
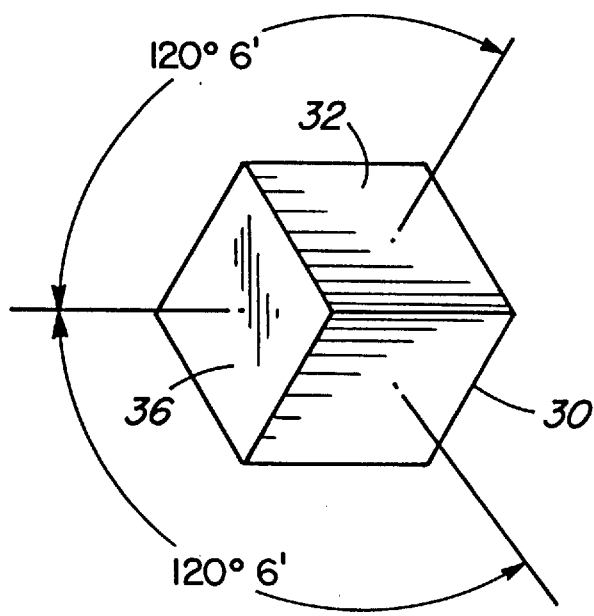
FIG. 5 is a plan view of a reflex pin head showing its face angles adjusted according to the present invention.
Figure 6:
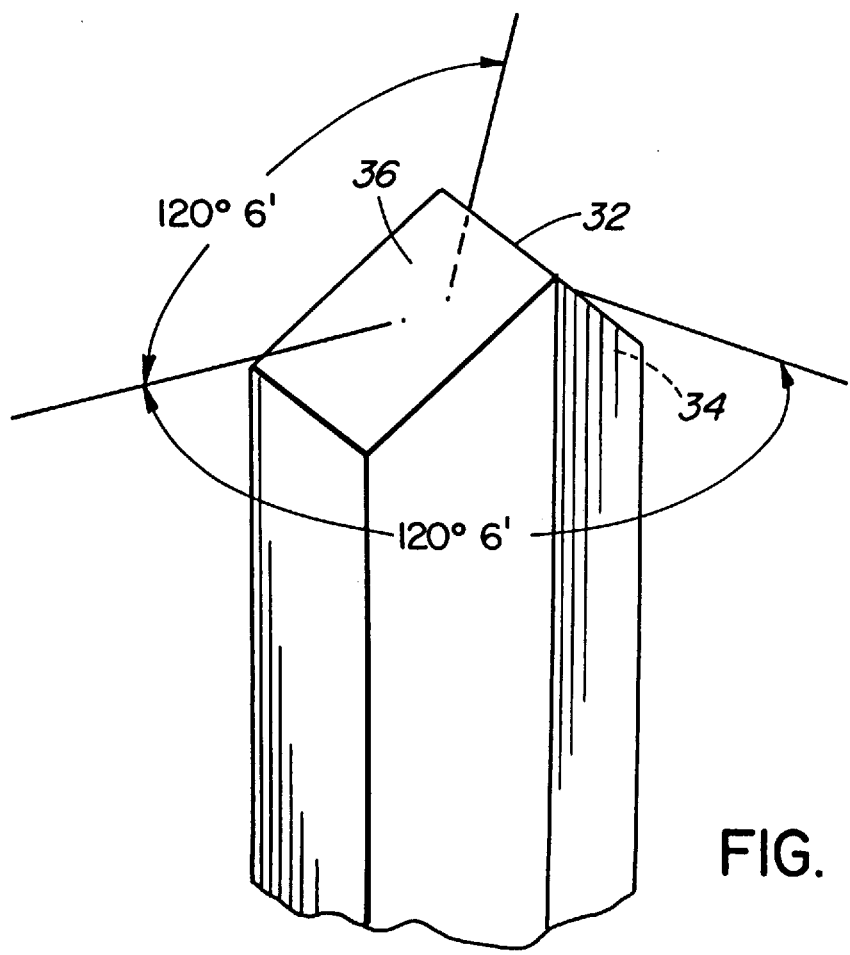
Figure 7:
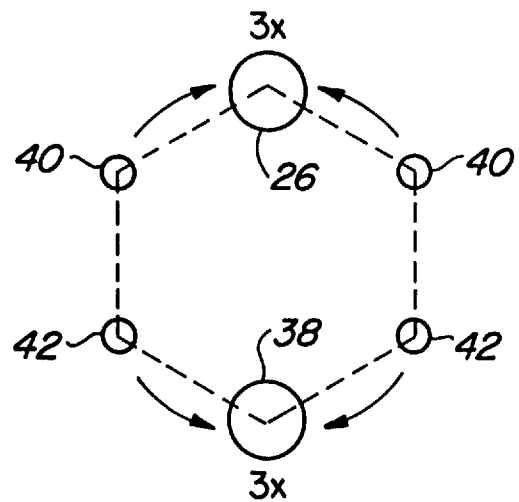
FIG. 7 is a view similar to FIG. 4 but showing the redirected light pattern according to the invention.

As shown in FIGS. 5 and 6, a reflex pin 30 in accordance with the invention has its operative end cut so that its three faces 32, 34 and 36 have their relative positions changed with respect to one another. Instead of the faces 32 and 34 being located 120° (measured on a horizontal plane) from one another, face 32 as well as face 34 have been adjusted so that they are each 120°6' from face 36. This results in a change in the pattern of the light reflected into the zone of reflectivity such that the light normally reflected to the lateral points on the hexagon and illustrated as 40 and 42 in FIG. 7, are redirected so that the portions 40 on the lateral sides of the hexagon are redirected to the top position 26 in the hexagon and the lower lateral points 42 are redirected to the lower point 38 in the hexagon. While the redirected portions 42 are moved to reinforce the light at the lower part of the hexagon and this is out of the range of the viewer, nevertheless the reflected light from points 40 to the upper position 26 of the hexagon theoretically triples the intensity of the light at the upper point 26 from that normally received on the hexagon shown in FIG. 1.

Figure 8:
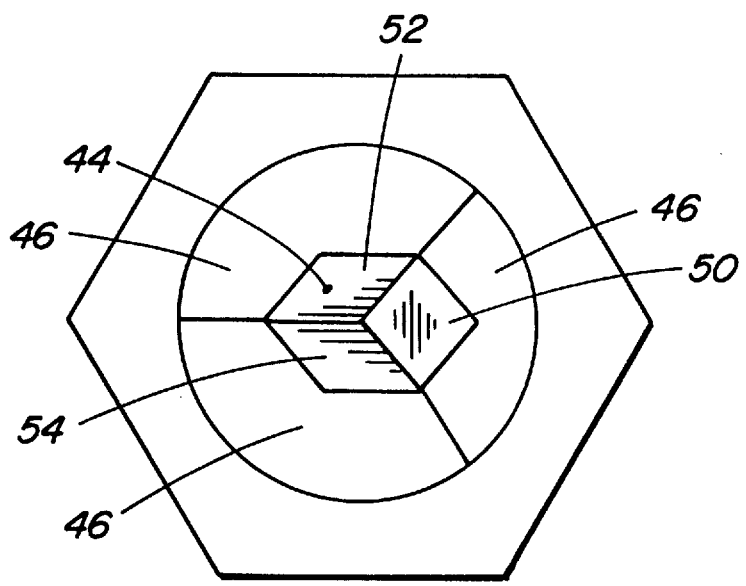
FIG. 8 is a schematic view of one method of securing reflex pins in a grinding and lapping operation.

One method of securing reflex pins in a grinding and lapping operation to make the face cuts in accordance with the invention is shown in FIG. 8. A pin 44 is secured in a collet 46 and face 50 of pin 44 is finished to its proper angle. The collet is then rotated 120°6' to subsequently finish face 52 and a similar rotation is applied to the collet to finish face 54 of the pin.

Figure 9:
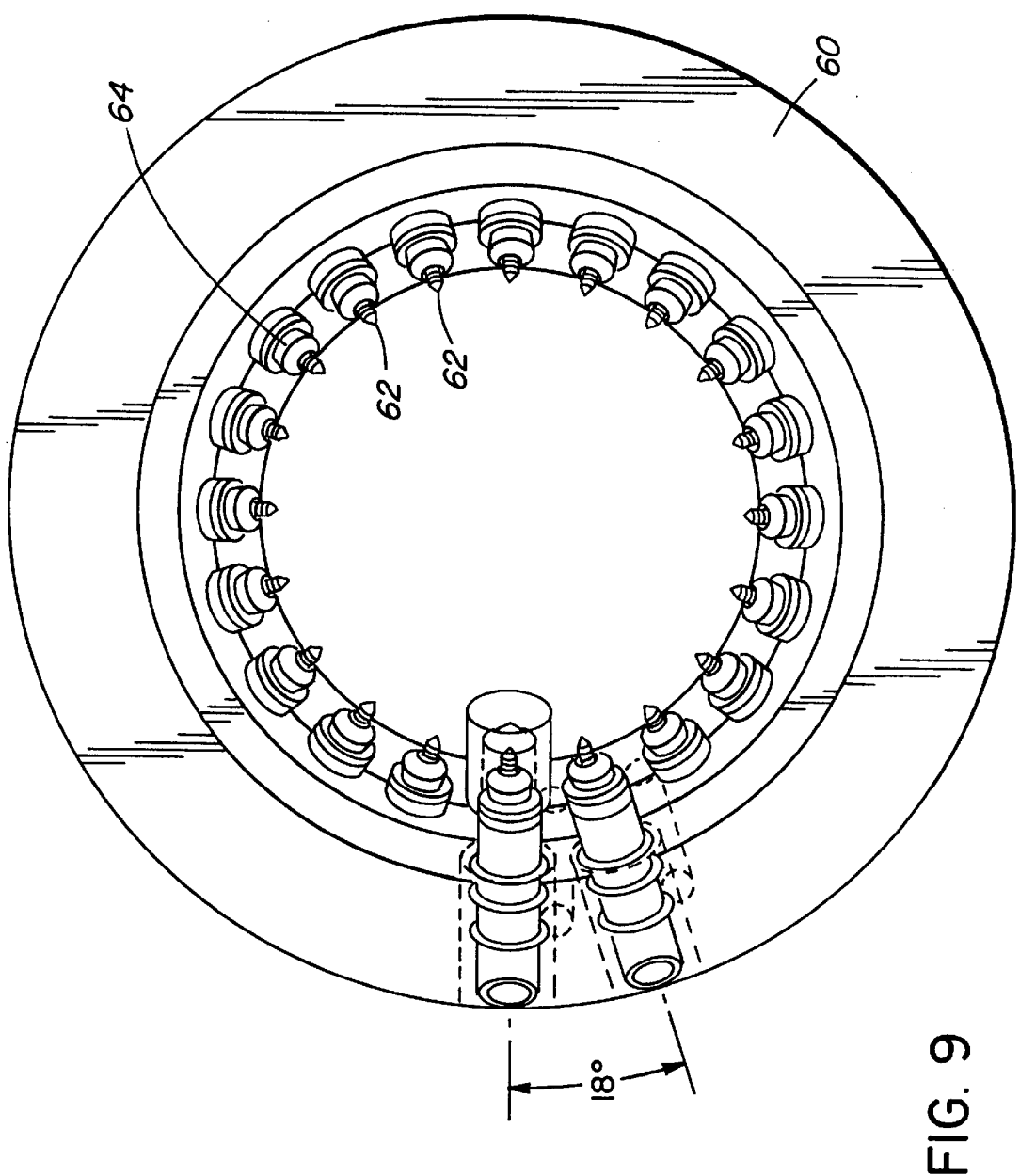
FIGS. 9 and 10 are plan and sectional views respectively of apparatus for handling a plurality of pins in a machining operation.
Figure 10:
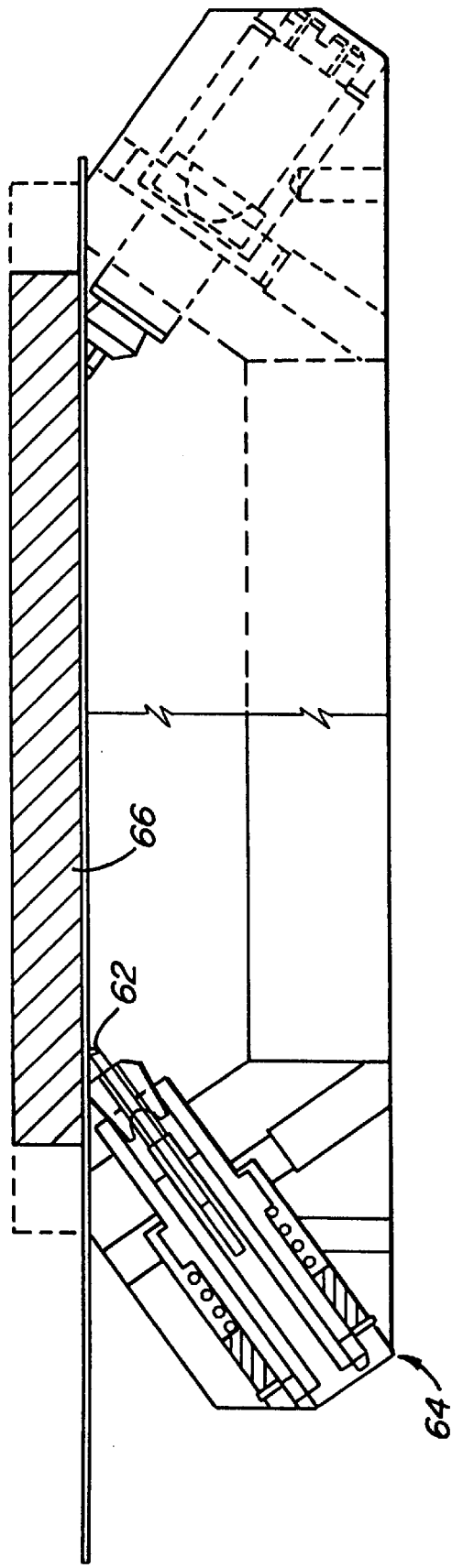

FIGS. 9 and 10 illustrate a base collar 60 in which a plurality of pins 62 are adjustably mounted in collets 64. As shown in FIG. 9 the pins are presented to a grinding and lapping surface 66 for the finish to their proper angles and, subsequently, each collet can be rotated 120°6' to finish the other angles, as required, for each of the pins.

As described, in a preferred form of the invention, each pin would have two of its faces cut to 120°6' from the other, reference or (zero) face and this adjusted angle of two of the faces changes the distribution of the reflecting light. In a reflecting surface product such as a reflector in the taillight assembly of an automobile; either all of the pin faces could be altered in accordance with the invention or a given section of pins in the production of the molds from which the reflecting surface is made could be altered.

While the present invention has been described relative to its applicability to an automotive scenario, it will be appreciated that the invention does have a wider use as in reflective surfaces used on road signs or any other type of retroreflective surface.

While the invention has been described in connection with a specific embodiment thereof and in a specific use, various modifications thereof will occur to those skilled in the art without departing from the spirit and scope of the invention as set forth in the appended claims.

The terms and expressions which have been employed in this specification are used as terms of description and not of limitations, and there is no intention in the use of such terms and expressions to exclude any equivalents of the features shown and described or portions thereof, but it is recognized that various modifications are possible within the scope of the invention claims.

I claim:

1. Reflex pins for use in the manufacture of reflector assemblies or surfaces wherein each of said pins have each of their three cube faces angled at 120° with respect to adjacent faces on said pin; the improvement comprising having selected cube faces of said pins cut to an angle that is adjusted from the conventional angle of 120° whereby light reflected from a product of such reflex pins is redirected from one area of a zone of reflectivity to substantially increase the intensity of said reflected light to the location of a viewer or a recording device's light sensitive element at another area of the zone of reflectivity.

2. Reflex pins according to claim 1, said pins having three cube faces and wherein two of said faces are cut to an angle that is adjusted from the conventional angle of 120° to 120°6'.

3. Reflex pins for use in the manufacture of reflector assemblies or surfaces wherein said pins have a plurality of cube faces angled at 120° with respect to one another; the improvement comprising having selected cube faces of said pins cut to an angle that is adjusted from the convention angle of 120° to an angle of approximately 120°6' whereby light reflected from a product of such reflex pins is redirected from one area of a zone of reflectivity to substantially increase the intensity of said reflected light to the location of a viewer or a recording device's light sensitive element at another area of the zone of reflectivity.

4. In a reflector assembly comprising a plurality of cube-corner reflex elements each having three cube faces angled at 120° with respect to one another to reflect incident light beams into a zone of reflectivity; the improvement comprising forming said reflector assembly with cube-corner reflex elements wherein selected cube faces of said reflex elements have said relative angles adjusted from 120° whereby light reflected from said reflector assembly is redirected from one area of said zone of reflectivity to substantially increase the intensity of reflected light to a location of a viewer or a recording device's light sensitive element at another area of said zone of reflectivity.

5. A reflector assembly according to claim 4 wherein only a portion of said reflex elements therein have selected faces with angles adjusted from 120°.

6. A reflector assembly according to claims 4 or 5 wherein said adjusted angle is approximately 120 °6'.

7. A method of redirecting a portion of light normally reflected into a zone of reflectivity from a reflecting surface formed of cube-corner reflecting elements the faces of which have operative reflex angles of approximately 120°, with respect to one another said redirection being from one area of said zone of reflectivity to another area therein wherein said reflected light is thereby intensified; said method comprising adjusting the angle of selected reflecting faces of the cube-corner reflex elements from 120°.

8. A method according to claim 7 wherein said adjusted angle is approximately 120°6' and wherein said another area is the location of a viewer or a recording device's light sensitive element.

\* \* \* \* \*